350-342

SR

XR 3,965,476

United States

Wenander et al.

[11] 3,965,476

[45] June 22, 1976

[54] LASER PRINTING METHOD AND SYSTEM

[75] Inventors: Per E. Wenander, Schweiz; Carl E. Lundquist, Lucerne, both of Switzerland

[73] Assignee: Per E. Wenander, Meggen, Switzerland

[22] Filed: July 5, 1974

[21] Appl. No.: 486,167

[52] U.S. Cl. .............................. 346/1; 350/160 LC; 354/5; 346/76 L; 346/17; 346/108

[51] Int. Cl.² .................... B41B 17/10; G06K 15/02

[58] Field of Search ................ 346/76 L, 108, 17, 1; 354/5–16; 350/160 LC

[56] References Cited

UNITED STATES PATENTS

| | | | |
|---|---|---|---|
| 3,330,191 | 7/1967 | King et al. | 354/7 |
| 3,517,592 | 6/1970 | Kollar | 354/6 |
| 3,573,847 | 4/1971 | Sacerdoti | 346/76 L |
| 3,626,830 | 12/1971 | Sobottka | 354/12 |
| 3,708,050 | 1/1973 | McCarthy | 197/1 R |
| 3,709,117 | 1/1973 | Sansone | 354/7 |
| 3,710,698 | 1/1973 | Sinnott et al. | 354/7 |
| 3,721,165 | 3/1973 | Knoll | 354/15 |

*Primary Examiner*—Joseph W. Hartary
*Attorney, Agent, or Firm*—Bacon & Thomas

[57] ABSTRACT

A non-impact radiant energy printer for producing indicia such as alphanumeric characters on an untreated receiving media such as an ordinary piece of paper. The printer provides memory storage capability for automatically printing textual material together with display and editing facilities.

28 Claims, 14 Drawing Figures

3965476
OR IN 346/1

Fig. 1.
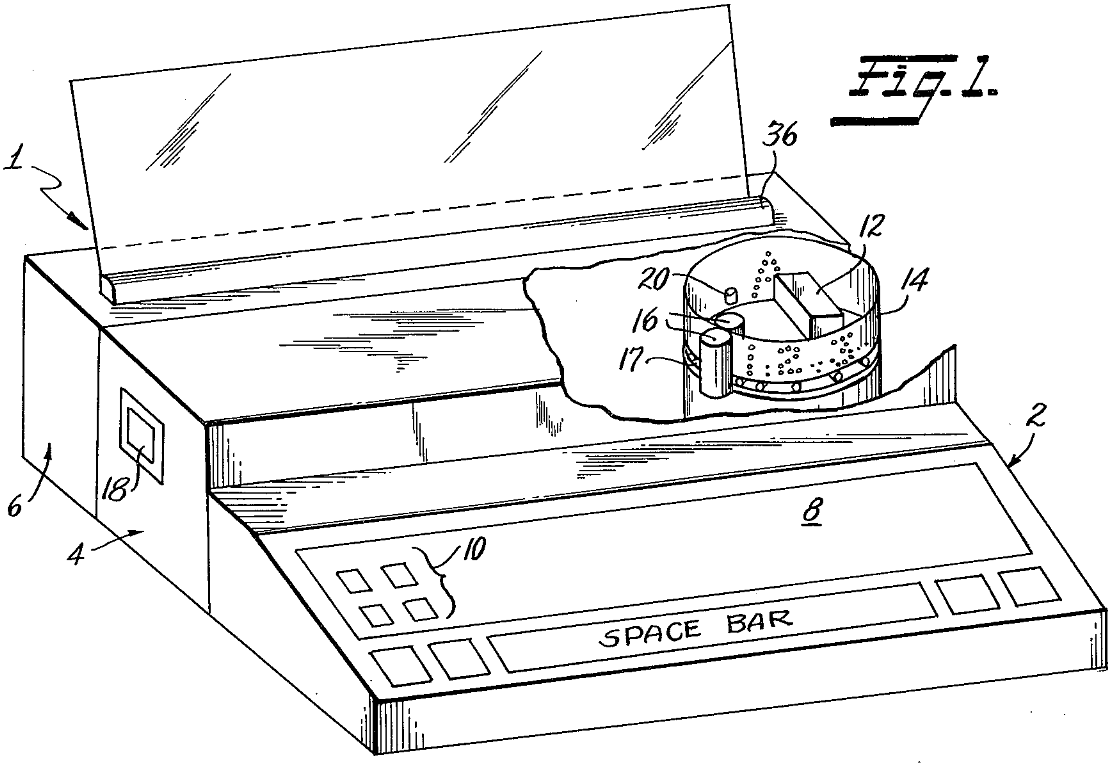
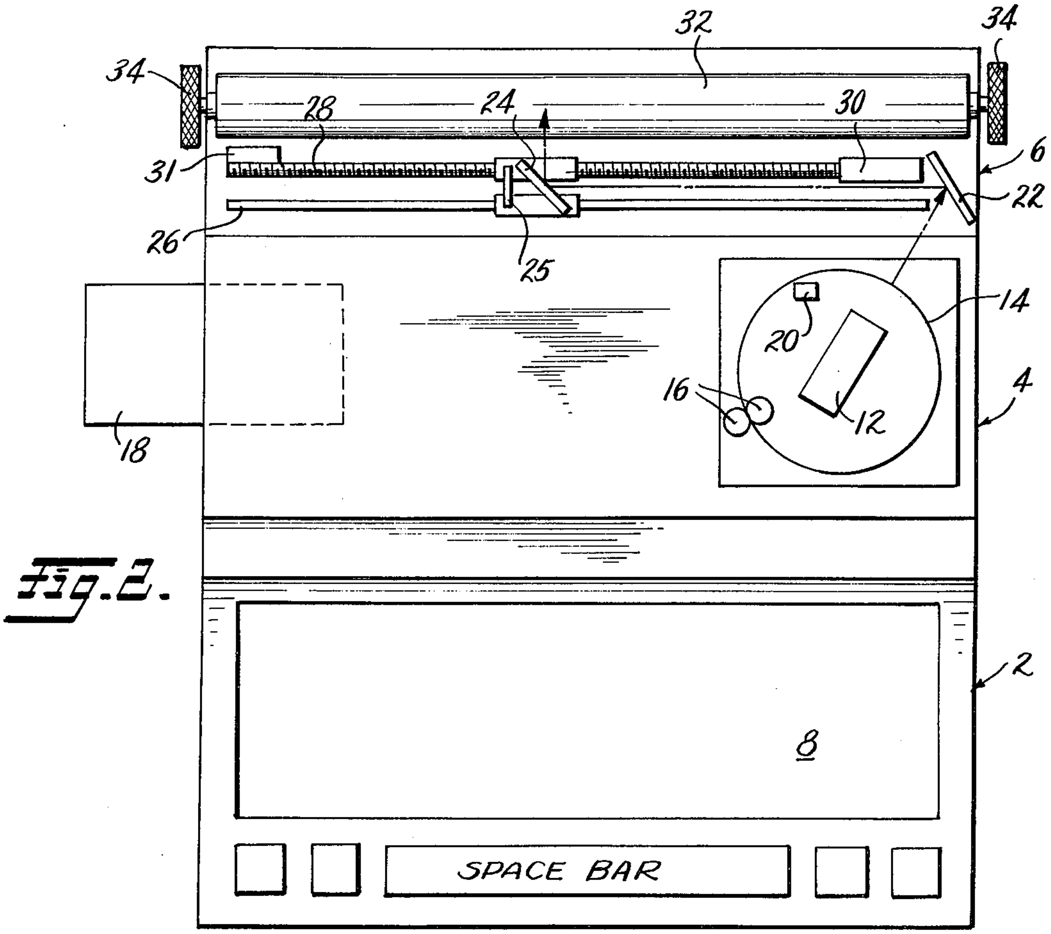
Fig. 2.

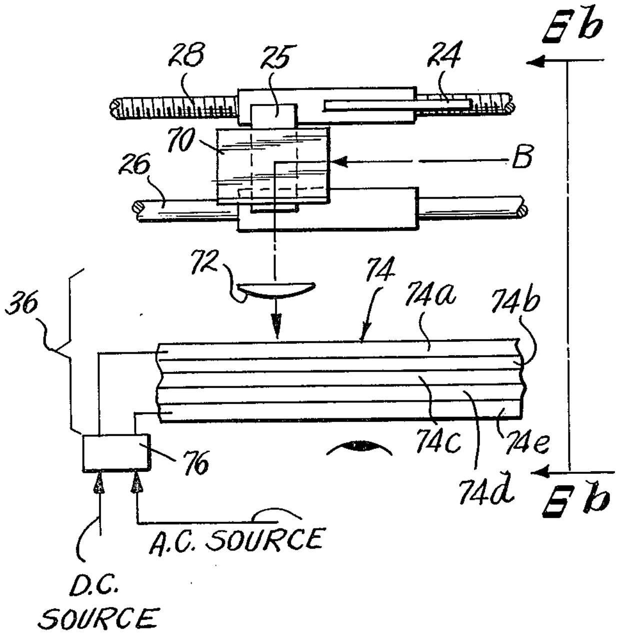
Fig. 6a.
Fig. 6b.
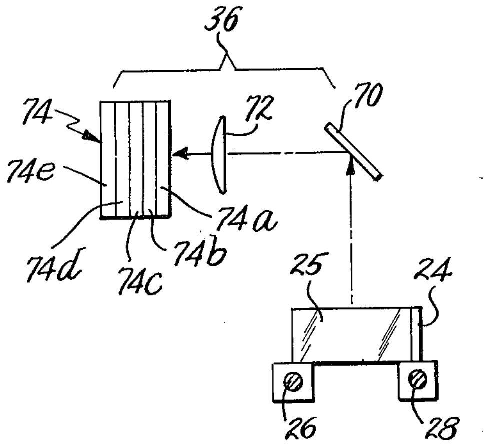
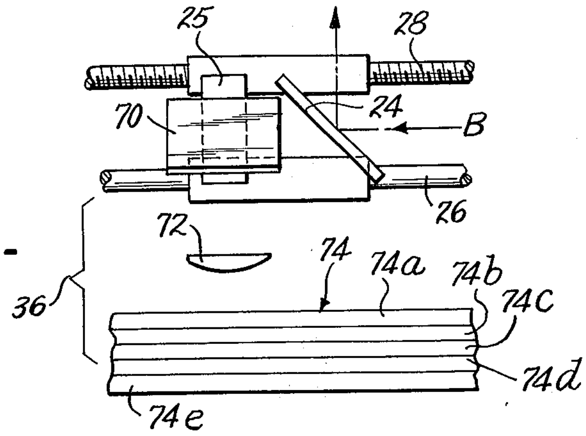
Fig. 6c.
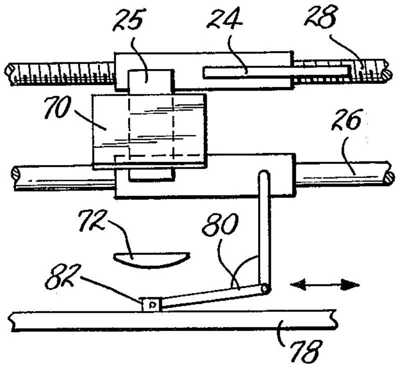
Fig. 7a.
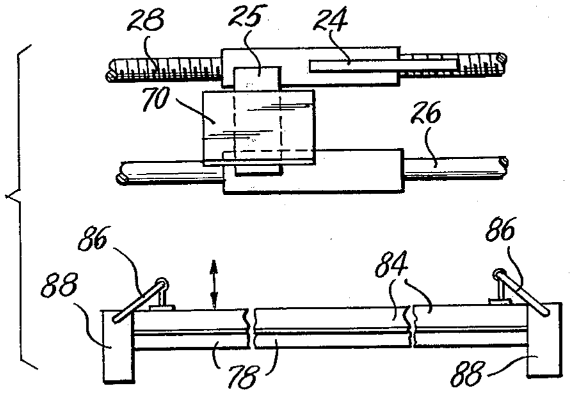
Fig. 7b.

LASER PRINTING METHOD AND SYSTEM

BACKGROUND OF THE INVENTION

1. Field of the Invention

The invention pertains to non-impact printer/plotters utilized for automatically printing/plotting alphanumeric, graphic and half-tone images on receiving media. More specifically, the invention pertains to laser printers/plotters having storage and editing facilities.

2. Description of the Prior Art

Non-impact radiant energy printers have been known in the prior art as illustrated by the laser printer of Kaufman et al. U.S. Pat. No. 3,721,991 and character recorder of Sacerdoti U.S. Pat. No. 3,573,847. These patents disclose the use of modulated laser beams to effectuate a printing on paper responsive to the particular radiation utilized. Various other patents disclose laser printing methods such as Kamenstein U.S. Pat. No. 3,570,380, Brown et al. U.S. Pat. No. 3,506,779 and Fishback U.S. Pat. No. 3,410,203. Further these prior art techniques either utilize costly or complicated laser scanning techniques to produce a given printed character or they require special thermographic paper responsive to the laser heat to effectuate a transfer of print material. Additionly, the universality of the prior art techniques is restricted in that no graphic or half-tone images may be produced.

SUMMARY OF THE INVENTION

It is an object of the instant invention to provide a silent, high speed, non-impact printing/plotting system which does not involve complicated modulation of or scanning by the laser beam to effectuate the printing operation.

Another object of the invention is to provide a non-impact printing system wherein, for example, ordinary "untreated" paper may be utilized as the receiving medium.

Another object of the invention is to provide a display and editing capability for a laser non-impact printing device wherein data is displayed and may be corrected before printing on the receiving medium.

Another object of the invention is to provide for a modular printing system wherein units or discrete components may be readily interchanged to provide versatility of operation as well as efficient maintenance and service capabilities.

Another object of the invention is to provide for a high speed printing/plotting system for use in facsimile reproduction and as an on-line computer peripheral or receiving terminal.

Another object of the invention is to provide an easily interchangeable aperture mask to allow printing of a plurality of desired indicia and character fonts, as well as for graphic and half-tone printing.

Yet another object of the invention is to provide for a continuously rotating aperture mask to overcome continual starting and stopping of mechanical printing heads which result in a jittering of the printing mechanism in conventional mechanical typewriters.

The present invention provides for an impactless printer/plotter which utilizes a laser beam to effectuate a high speed, silent and reliable means of alphanumeric, graphic and half-tone image printing/plotting. The laser is mounted so that the laser traverses through a rotating aperture mask onto and via one fixed mirror and one moving mirror to provide projected images of selected characters, half-tones, etc. onto the receiving medium. The laser directly and physically chars the untreated paper to provide indicia thereon. The laser beam intensity may be adjusted so as to produce the desired degree of darkening or charring of the receiving medium.

BRIEF DESCRIPTION OF THE DRAWINGS

Other objects and novel features of the invention will best be understood from the following description when read in conjunction with the accompanying drawings wherein:

FIG. 1 is an isometric projection of a laser typewriter shown partially sectioned;

FIG. 2 represents a top plan view of the laser printer of FIG. 1 shown with the projection display removed;

Figure 5:
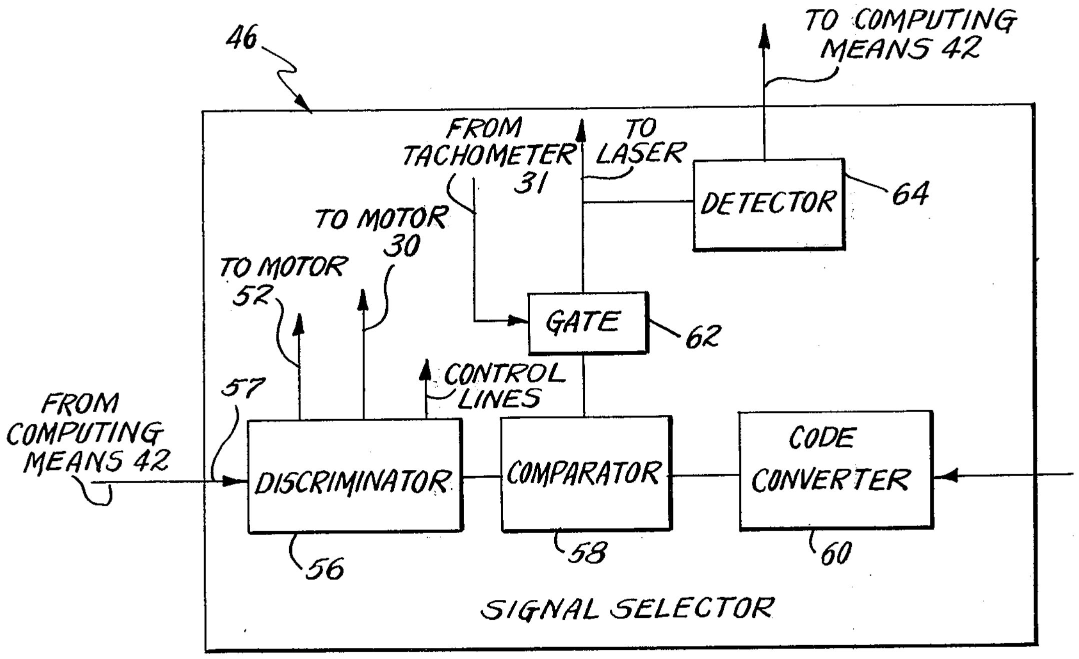
Figure 4:
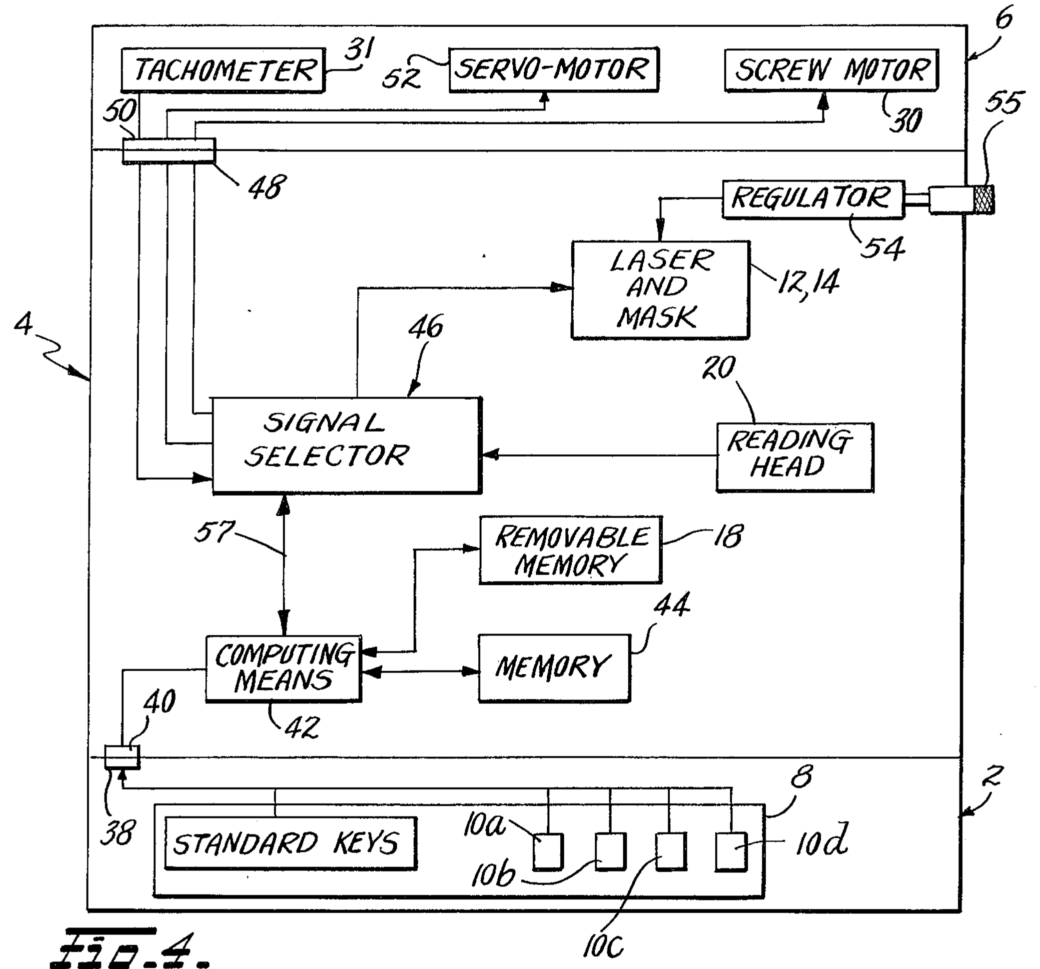
Figure 9:
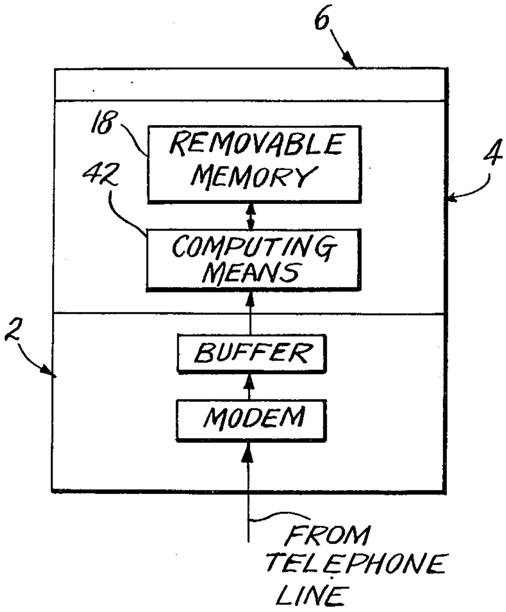

FIGS. *3a* and *3b* show cut-away views of the aperture mask as shown by the arrows 3—3 of FIG. 2;

FIG. 4 shows a block diagram of the electronic control system for the laser printer/plotter;

FIG. 5 illustrates a block diagram of the signal selector;

FIGS. *6a–6c* illustrates details of the projection display and mirror arrangements;

FIGS. *7a* and *7b* show several embodiments of erasure apparatus for use in the invention;

FIG. 8 is a functional diagram illustrating the operation of the laser printer;

FIG. 9 is a block diagram showing another embodiment of the invention; and

Figure 10:
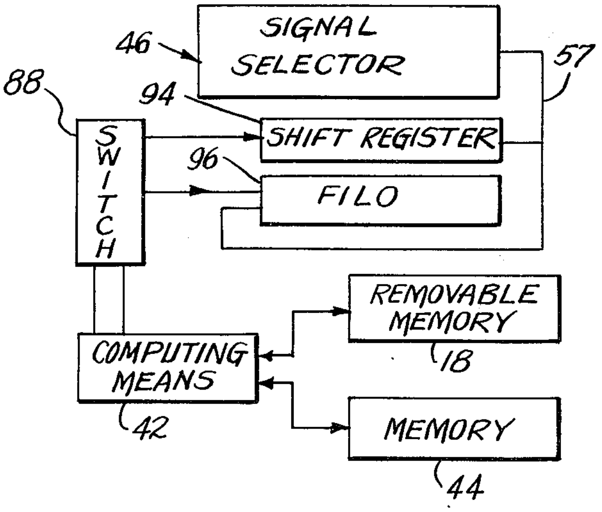

FIG. 10 is a block diagram for use in the embodiment of FIG. 9.

DETAILED DESCRIPTION OF THE PREFERRED EMBODIMENT

As illustrated in FIGS. 1 and 2, the laser printer 1 comprises three separate modular units consisting of an input unit 2, a control and laser unit 4, and an output unit 6. The input unit 2 contains a keyboard 8, having a plurality of keys such as a conventional typewriter or an electronic mini-computer. Additionally, special keys 10 are also provided. Adjacent the input unit 2 is the control and laser unit 4 containing the laser 12 positioned in the center of a rotating aperture mask 14. The aperture mask 14 is driven by capstans 16 which are rotated by a motor (not shown). A track 17 supports the aperture mask 14 for rotation. The control and laser unit 4 also contains the control electronics as well as a removable storage memory 18, such as an electronic magnetic tape or disc memory. The control and laser unit 4 also contains a reading head 20 for sensing the orientation of the aperture mask 14 as is explained further below.

The output unit 6 contains a fixed mirror 22, a first moving mirror 24, and a second moving mirror 25. The moving mirrors 24 and 25 are supported by means of a guide rail 26 and are driven by a drive screw 28. The drive screw 28 is powered by a motor 30. A tachometer 31 is provided to sense the rotation of screw 28. A roller 32 is shown which may be manually controlled by means of tuning knobs 34. Automatic advancing of the roller 32 is also provided as explained below. The output unit 6 also contains a projection display 36 (FIG. 6) which may comprise a liquid crystal display element.

Figure 3A:
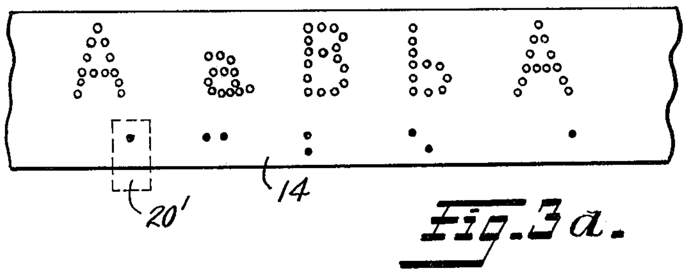
Figure 3B:
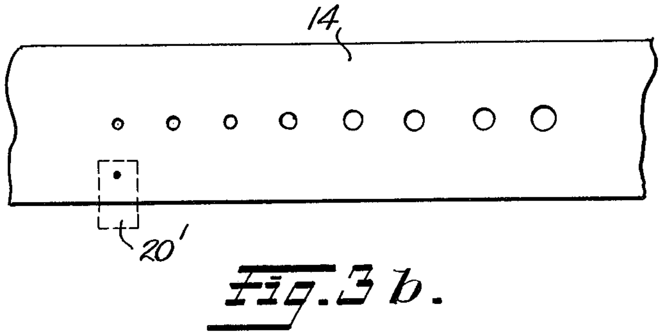

The partial view of the aperture mask 14 is illustrated in FIGS. 3a and 3b. As shown, the aperture mask 14 contains a plurality of small aperture patterns in the shape of desired indicia or characters. Corresponding to each aperture pattern is a magnetic code which is sensed by the reading head 20. The position of the reading head 20 is illustrated by the dotted line 20′ in FIG. 3. A unique code is associated with each of the patterns on the aperture mask 14. The aperture mask 14 itself is readily interchanged by merely lifting the mask from the supporting track 17 and the supporting housing and repositioning the new mask therein. In this manner a variety of different character and indicia fonts may be made availible as well as a variety of special characters, numerals, etc. In addition, a mask containing a plurality of apertures of different diameters may be utilized to permit graphic and facsimile printing using a gray scale. Such a facsimile type mask is shown in FIG. 3*b*.

Additionally, the number of times a particular symbol appears during one revolution of the mask 14 may be selected to correspond to the statistical usage of the symbol. Thus the symbol A may appear several times as shown in FIG. 3 to increase the overall operating speed of the printer particularly when used as a data output terminal for a computer.

FIG. 4 illustrates a block diagram of the electronics associated with the input unit 2, the control and laser unit 4, and the output unit 6. The keyboard 8 contains a plurality of special keys 10*a*–10*d* as explained more fully below. Wires connecting the special keys 10*a*–10*d* and the keys of the conventional keyboard 8 are sent to the control and laser unit 4 via connectors 38 and 40. These wires are fed to a computing means 42 housed in the control and laser unit 4. The computing means 42 may be any of several well known mini-computers (such as, for example, the Nova ⊥200) which are both small and lightweight and provide sufficient numerical capability to serve as a control processor. Computer means 42 is connected to memory 44 as well as to the removeable storage memory unit 18. In addition for computing means 42 is connected to a signal selector 46 which is more fully described below.

The control and laser unit 4 further comprises the laser 12 together with the aperture mask 14. The signal selector 46 is connected to the laser for pulsing it at the appropriate time. Selector 46 is also connected to the screw motor 30 housed in the output unit 6 by means of connecting wires and connectors 48 and 50. A servo motor mechanism for rotating the roller 32 is provided and comprises the signal selector 46 and the servo motor 52. The control and laser unit 4 also contains a laser intensity regulator 54 which is manually controlled by means of knob 55.

FIG. 5 illustrates the signal selector 46 and comprises a discriminator 56, comparator 58 and code converter 60 which all are well known in the art. The discriminator 56 is connected for receiving signals from the computer 42 by means of input wire 57 and to provide digital discrimination between character signals and non-character or control signals. For example, control signals may be signals representing certain space information so that the drive screw 28 may be rotated to advance the movable mirror 24 before printing the next character. The discriminator 56 also differentiates between types of control signals such as those going to motors 30 and 52. The character signals are sent through the discriminator 56 to the comparator 58 where the coded signals are compared with coded signals from the reading head 20 via a code converter 60. The code converter 60 is adapted to convert the reading head code into a code compatible with the output data word from the computing means 42. A simple diode matrix and logic means may be utilized as the code converter 60. The output of the comparator 58 provides a trigger signal to the laser 12 for pulsing the laser at the appropriate time when the desired aperture pattern is aligned with the laser output. A gate 62 is also provided which is enabled only when the tachometer 31 indicates screw 28 is stationary. Detector 64 is connected to respond to the output of the comparator 58, via gate 62, and to provide a signal to the computing means 42 which inhibits further pulsing of the laser until new data is provided from the computing means 42.

FIGS. 6*a*–6*c* show detailed illustrations of the moving mirrors 24 and 25 during the display and print modes of operation. The display mode is illustrated in FIGS. 6*a* and 6*b* wherein the first moving mirror 24 is shown positioned parallel to the drive screw 28 so as not to intercept the radiant energy beam shown by the dotted line B. The position of mirror 24 is thus seen pivoted (by means not shown) from the print mode position which is illustrated in FIG. 2 and FIG. 6c. The position of the second moving mirror 25 is fixed relative to the drive screw 28 both in the display and print modes of operation. As best illustrated in FIG. 6*b*, the projection display 36 comprises a mirror 25, a mirror 70, and an anamorphic lens 72, and a liquid crystal display means 74. The anamorphic lens is used to correct the reflections of the aperture shape introduced by the mirrors 22, 25, and 70 which are in the optical path of the laser beam after it passes through the aperture mask 14. Both the anamorphic lens and the mirror 70 may be securred to mirror supports for mirrors 24 and 25 so that they may move as a unit in the optical unit. The display means 74 may comprise a five layer system in which 74*a* is a transparent conductive electrode (tin oxide coated glass), 74*b* is a transparent photoconductive layer, 74*c* is a transparent barrier layer, 74*d* is the liquid crystal layer itself and 74*e* is another transparent conductive layer. The electrodes 74*a* and 74*e* are connected to voltage potential means via switch means 76. The activation of the liquid crystal to display the light image is carried out by connecting the electrodes to an appropriate D.C. source whereas erasure is accomplished by connecting the electrodes to the A.C. source. The liquid crystal display per se is well known in the art and is illustrated by the U.S. Pat. No. 3,798,452 to Sitz el al. and the U.S. Pat. No. 795,516 to Stahr et al. The total length of the liquid crystal display 74 may be made up of a plurality of discrete sections so that only specific discrete sections of the display may be activated for display and/or erasure. The switch means 76 may thus comprise a single switch controlling the entire display 36 or a plurality of separate switches controlling the plurality of discrete segments of the display. In either event, the switch means are controlled by signals from the signal selector 46.

Figure 7:
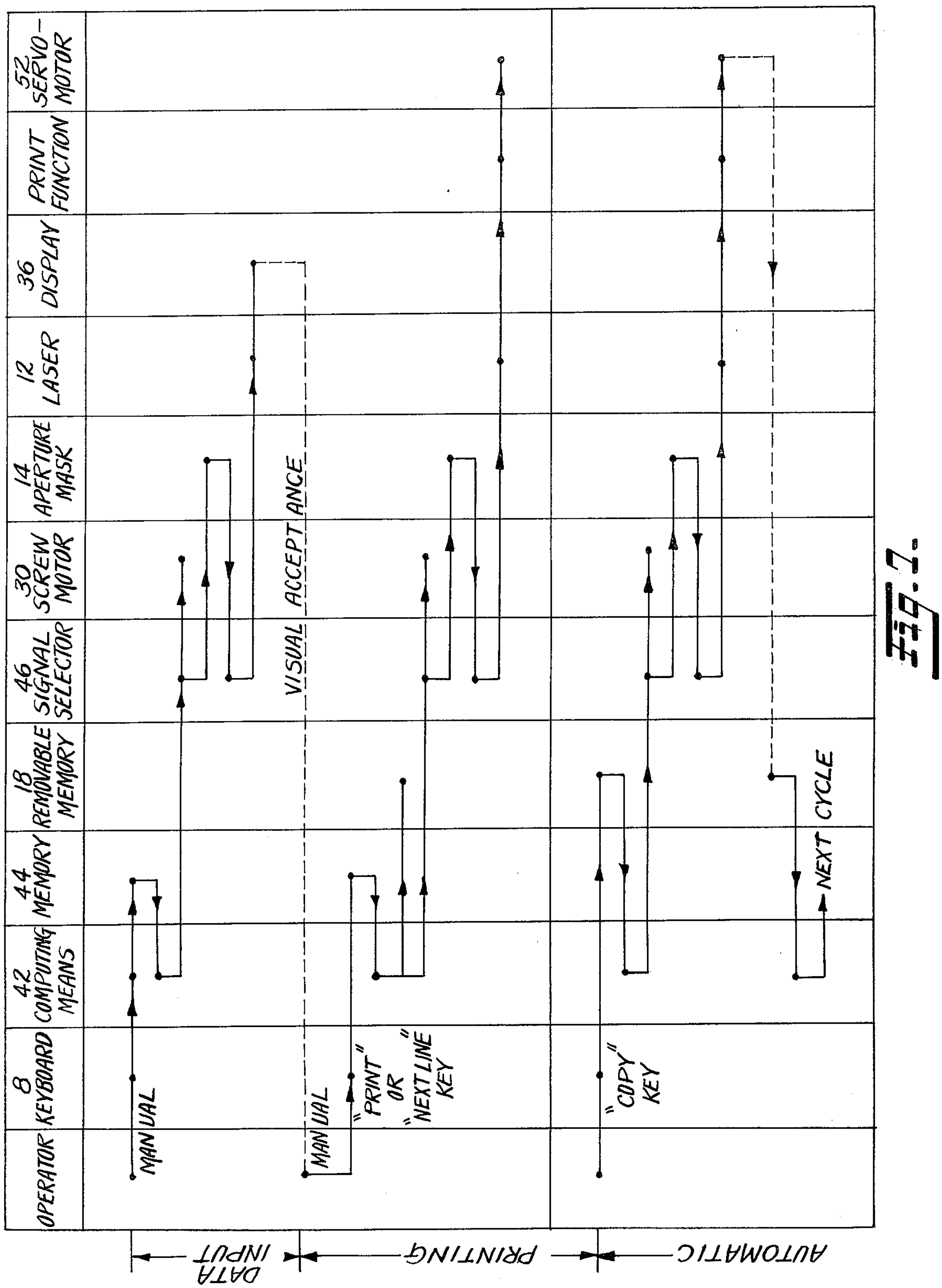

An alternate embodiment of the display means 36 is illustrated in FIG. 7*a*. The liquid crystal element 78 is here a thermal sensitive crystal which needs no external electronic potential source. The heat from the laser itself activates the liquid crystal element 78 for display. The display may be erassed by means of applying pressure to the surface of the element 78. Pressure means are shown in the form of a spring biased finger 80 having a tip 82. The tip may, for example, be made of felt. With this arrangement selected areas of the display may be erased during a backstep operation to correct an erroneously entered symbol during manual keyboard operation. In yet another embodiment the entire liquid crystal element 78 may be erased all at once using a transparent pressure element 84 positioned to apply pressure to the entire back surface of the liquid crystal element 78 as shown in FIG. 7*b*. In this figure, fingers 86 are mounted on support element 88 and may be biased to apply pressure to the element 84 by rotation upon command from the signal selector via electro-mechanical means (not shown). Suitable thermal sensitive liquid crystal films are readily available for use and may be obtained, for example, from R.P.R. Inc., 6700 Sierra Lane, Dublin, Calif., and are described in U.S. Pat. Nos. 3,576,761; 3,619,254 and 3,647,279.

In operation, the operator enters specific character codes via the keyboard 8 of the input unit 2. Signals from the various slected keys are transmitted to the computing means 42 and to the memory 44. The memory 44 stores control information such as "space information" signals corresponding to the output (printed) width for each of the chosen characters or indicia of the keyboard 8. In addition memory 44 is utilized to store prior character space information as well as the full character text for a given line being entered by the operator. The entered line is not actually printed until it is fully displayed on the projection display unit 36 and accepted by the operator. Prior to actual printing the character line stored in memory 44, the operator may edit the displayed data and make corrections thereto.

In selecting the characters to be displayed the mirror arrangement of FIGS. 6*a* and 6*b* is utilized, and the screw drive 28 rotates in a first direction so as to cause the mirror 25 to move from left to right. (For languages in which one reads from right to left, the mirror 25 would scan in the opposite direction). The laser beam is pulsed when the signal selector 46, via comparator 58, has indicated that the character entered on the keyboard is now aligned with the laser output beam direction. The signal triggering the laser is however blocked by the gate 62 if the screw 28 is rotating. The insures that the mirror 25, as well as the mirror 70 and lens 72 are stationary. Thus, no blurring of the displayed image takes place.

The operator may detect any erroneously entered characters by looking at the projection display 36. By use of one of the special keys, key 10*a* (FIG. 4), the operator may erase the display to correct the error. The correction may be done in several ways. In the embodiment of FIG. 6*a* and 7*b*, the entire display is erased, and the operator starts entry of the line from the beginning. In this embodiment the key 10a, the "reject" key, also erases the memory 44 for the entire line. The drive screw 28 automatically repositions the mirrors 25 and 70 and the lens 72 back to the left hand side of the display 36. For the embodiment shown in FIG. 7*a*, the reject key may be used in backspacing the mirrors 25 and 70 and consequently the finger 80 to erase one character at a time to remove the incorrect character. The finger 80 is pivoted to bring the tip 82 to bear against the display back surface as shown. In this embodiment the contents of memory 44 are also erased one character at a time and it is not necessary to erase the entire line. Partial line erasures may also be achieved if the display means 74 of FIG. 6a is made up of a plurality of discrete segments as discussed above. Only selected segments of the display would be erased by the A.C. field, and the entire line need not be rewritten.

Once the entire line has been correctly entered and displayed, the drive screw 28 rotates in the opposite direction so that printing is done from right to left across the receiving medium. This process saves considerable time in that the return of the moving or scanning mirrors to the initial display position also effectuates the printing of the line text and subsequent erasures of display and memory for entry of new data. A second special key 10*b*, the print key, may be utilized to initiate printing of the data.

In the printing mode, the "space information" signals from the memory 44 are transferred to the signal selector 46 via computing means 42 which in turn sends the data via the discriminator 46 to the screw motor 30. The amount of rotation of the drive screw 28 depends upon the particular character and its position within the text line. For example, if the character to be printed is the first on a line, then the number of revolutions of the drive screw 28 is equal to half of the space for the character selected. However, if the character selected is within a word, the number of revolutions of the drive screw 28 will be equal to one-half of the required space for the previous character, plus one-half of the required space for the character in question. In addition, if the character to be printed is the first character of a second or later word on a line, then the drive screw 28 is rotated one-half the number of revolutions required for the last character, plus the standard space between words (represented by the space bar shown in FIG. 2), plus one-half the required space for the character in question. The space information data for each character is determined by the computing means during entry and display of the characters. Standard table look-up techniques may be employed to determine the fixed width of each character (assuming a magnification of unity in the optical system), and the positional information is readily accumulated from the fixed width requirements for preceeding and succeeding characters of the character in question. The space bar on the keyboard is treated as representing a conventional character having a fixed width. Since the computing means associates the correct width or space information during the relatively slow display mode (keyboard entry mode), the information is readily available for the high speed printing mode.

In this manner the drive screw 28 is rotated to position the moving mirror 24 to the appropriate position along the roller 32. The tachometer 31 senses the rotation of the drive screw 28 and sends an enable signal to gate 62 when the drive screw 28 has stopped rotating. When gate 62 is enabled by the tachometer 31, signals from the comparator 58 may be sent to actuate laser 12 at the appropriate time. The appropriate time is determined by the position of the selected character aperture pattern in front of the laser 12 so that the pulsing of the laser 12 will produce a coherent light bundle in the shape of the selected aperture, such as a specific character or indicia to impinge upon the fixed mirror 22, the moveable mirror 24 and the receiving medium (FIGS. 2 and 6*c*). Signals from the reading head 20 need not be in alignment with the light output from the laser 12 as the code corresponding to the character adjacent the reading head 20 may always be selected to represent the character actually positioned in front of the laser beam irrespective of where the reading head 20 is physically located with respect to the rotating aperture mask 14.

Aperture mask 14 is rotated at a sufficiently fast rate to allow practically instantaneous alignment of the selected aperture pattern with the laser output beam once the moving mirror 24 has reached the appropriate alignment position. Thus, the comparator 58 continuously compares the code supplied from the computer 42 with the code supplied from the reading head 20. However, the output signal from the comparator 58 is only fed to the laser 12 if the tachometer 31 output signal indicates that the drive screw 28 is stationary, thus indicating completion of the movement of the moveable mirror 24. Detector 64 senses the laser pulsing signal from comparator 58 and sends a "ready" signal to the computing means 42 so that a new character may be printed.

The pulsing of the laser 12 results in a short burst of laser radiation (on the order of a few milliseconds). The rotation of the aperture mask 14 during this short interval of time is negligible so that the character appearing on the receiving medium is sharp and not blurred. The bundle of light representing the character is reflected from the fixed mirror 22 to the moveable mirror 24 and subsequently to the receiving medium.

The computing means 42 may also be utilized to provide margin justification. The computing means 42 divides the space between the last character, punctuation mark or sign on the line and the right predetermined border into so many small distances as existion spaces between words or single characters on the line, and adds each small distance to every initially given space between words before the signals from the memory 44 are transmitted to the selector 46. In this way a perfect, vertical right margin as well as left margin is automatically obtained.

Another special key, the "next line" key 10*c*, may be utilized if the displayed data on the projection display 36 does not show a completely filled line. In this case the computer 42 will make no space additions to the line text since no margin justification is needed. Upon use of the next key 10*c*, a signal is sent to the servo motor 52 via the signal selector 46 to actuate rotation of roller 32. The roller 32 is rotated a slightly larger distance than in the "print" mode in order to separate paragraphs a larger spacing than successive lines within a paragraph.

Although most paper has very narrow variations with regard to heat sensitivity, the intensity of the laser beam may be varied to produce the proper charring effect for the particular paper utilized. A manual regulator 54 controls the laser beam intensity. In this manner, the degree of charring of the paper may be regulated so as not to burn a hole in the paper but yet obtain sufficient charring to produce a clearly descernible dark image. Of particular advantage is the fact that the system may be utilized for regular, untreated paper. It is noted that the aperture mask may be readily changed to allow printing in different fonts or different languages. If a different language is employed, the modular construction of the input unit 2, control and laser unit 4, and output unit 6 permits interchange of the input unit with another having a keyboard appropriate for the language employed. The memory unit 44 may likewise be interchanged to permit different character spacings to be associated with different key entries.

The removable memory 18 is utilized to store signals which are sent simultaneously to the signal selector 46 during a single line print operation. Thus, as each line is printed on the receiving medium, the memory 44 is emptied whereas the line is added to the removable memory 18. The removable memory 18 is large enough to store several pages of character data and may subsequently be utilized to produce a second or multiple copies after the original has been printed. A special key, the "copy" key 10*d*, is utilized for this purpose and the computing means sends a special copy signal to the signal selector 46 to effectuate the appropriate driving of the movable mirror 24 as well as the roller 32. In the copy mode, the display is not utilized although printing is now accomplished in both directions as is explained more fully below.

FIG. 8 shows a functional diagram of the laser printing operation showing the sequence of operations in inputting data and in using the special keys.

The modular design of the apparatus makes the unit readily adaptable as a data terminal. As shown in FIG. 9, the laser printing device is utilized to transmit data directly received from a telephone line without the need for the input keyboard. Data received from the telephone line would be transmitted to the computing means 42 by conventional input buffers and data modem. In this mode of operation, the removable memory 18 is used directly to store the incoming data for subsequent printing.

The printing of the received data is here essentially the same as the printout of any data stored in removeable memory 18. The computing means 42 retrieves the data from the memory 18 and associates with it the space information as retrieved from memory 44 is the usual manner. As shown in FIG. 10, the data is fed from the computing means 42 to a suitable switching means 88 over data line 90. The switching means 88 is itself control by the computing means 42 via line 92 to direct the data and associated space information to one of two storage registers: a first-in/first-out register means, as, for example, shift register 94 and a first-in/last-out (FILO) register 96. Both of these registers are connected to the signal selector 46 over the input wire 57. As the space information is accumulated by the computing means 42, the data is first stored in register 94 for subsequent left to right printing of the characters; however, when the accumulated character widths and spacings indicate a full line, the computing means 42 sends a control signal over line 92 to activate the switching means 88 for connecting data to the FILO register 96. In this register, the data characters which are first stored (first-in) are the last read out (last-out) and consequently the printing takes place from right to left taking full advantage of the capabilities of the apparatus. After the FILO register 96 has stored the complete line next, new data for the next line restored in the shift register 94 and the process continues. After each dumping of the registers 94 and 96, the registers are cleared or re-set. For simplicity, the clock shifting and re-set signals are omitted from the drawing.

In yet another embodiment the computing means 42 is fed from a scanning electronic camera (television camera). The turning of the roller 32 is made in small increments and the mask 14 is equipped with a high number of apertures of different diameter corresponding to the number of gray levels desired. In this embodiment, not only texts and line drawings but also halftone images can be produced and transmitted in a convenient and speedy way.

While the invention has been described with reference to a rotating aperture mask, a flat aperture mask may also be employed wherein each character is decoded and used to actuate x-y driving means to position the mask in the laser beam output direction. Such systems, however, are slower than the rotating mask embodiment and add undersirable jitter and movement from starting and stopping of the mask.

It will be appreciated that while the invention has been described with reference to printing on a receiving medium such as paper, no limitation to such a medium is implied and the apparatus may be used on any surface sensitive to the radiation used. Although the invention has been described with reference to particular embodiments, it is understood that modifications and variations may readily occur to those skilled in the art and the claims are to be interpretted to include such modifications and variations.

We claim:

1. A method of recording on a receiving medium comprising the steps of:

a. directing a first radiant energy beam through an aperture mask thereby providing a first aperture-shaped beam, b. displaying said first aperture-shaped beam by moving an optical element in a first direction, c. storing data signals corresponding to said displayed first aperture-shaped beam, d. subsequent to said displaying and storing steps directing a second radiant energy beam through said aperture mask for providing a second aperture-shaped beam corresponding to said stored data signals, and e. marking a surface of said receiving medium with said second aperture-shaped beam by moving said optical element in a second, opposite direction.

2. A method as recited in claim 1 wherein said marking step comprises directly charring a surface of said receiving medium.

3. A method as recited in claim 1 wherein said directing step comprises the steps of:

a. rotating said aperture mask, and b. pulsing on said radiant energy beam when a desired aperture is aligned with the radiant energy beam direction.

4. A method as recited in claim 3 further comprising the steps of:

a. sensing the rotational position of said mask by sensing coded signals therein associated with said apertures, b. comparing said sensed coded signals with said stored data signals, and c. activating said radiant energy beam when said sensed coded signals match said stored data signals.

5. A non-impact printing device for forming indicia on a receiving medium comprising:

a. a radiant energy source for providing a radiation beam, b. a mask having a plurality of apertures therethrough, said apertures in the shape of indicia to be formed on said receiving medium, c. memory storage means, d. data input means connected to the memory storage means for inputting electrical signals to said memory storage means, said electrical signals corresponding to said apertures in said mask, e. means for rotating said mask for positioning said apertures for alignment with said radiation beam, f. means for detecting the position of said rotating mask and for providing detection signals associated with said apertures in said mask, g. means for viewing the indicia to be printed by an operator comprising:

1. displaying means,
2. means for comparing said detection signals with said stored electrical signals and for providing first energizing signals to said radiant energy source to turn on said radiant energy source thereby providing a first plurality of aperture-shaped radiation beams,
3. first optical means for projecting said first plurality of aperture-shaped radiation beams onto said displaying means, said first optical means moving a first direction substantially traversing the length of said displaying means.

h. means for directly charring said receiving medium for printing said indicia comprising:

second optical means for projecting a second plurality of aperture-shaped radiation beams onto said receiving medium, said second optical means moving in a second direction, opposite said first direction, said second plurality of aperture shaped radiation beams produced by second energizing signals from said comparing means to said radiant energy source and directly charring said receiving medium for printing said indicia.

6. A device as recited in claim 5 wherein said displaying means is a liquid crystal displaying means.

7. A device as rectied in claim 6 wherein said liquid crystal displaying means comprises first and second transparent electrodes and photoconductive and liquid crystal layers positioned there between.

8. A device as recited in claim 7 wherein said displaying means further comprises switching means for applying a DC potential to said electrodes for activating said liquid crystal layer.

9. A device as recited in claim 6 wherein said displaying means comprises a thermally responsive liquid crystal layer.

10. A device as recited in claim 9 wherein said liquid crystal layer is pressure responsive and said device further comprises:

means to apply pressure to said liquid crystal layer for erasing said displaying means.

11. A device as recited in claim 10 wherein said pressure means comprises means for erasing a single displayed aperture.

12. A device as recited in claim 10 wherein said pressure means comprises means for erasing the entire display means.

13. A device as recited in claim 5 wherein said first optical projecting means comprises:

a. a fixed mirror, and b. moving mirror means for directing said first plurality of aperture shaped radiation beams toward said displaying means said moving mirror means mounted for transversing the length of said displaying means.

14. A device as recited in claim 5 wherein said second optical projecting means comprises a moving mirror for directing said second plurality of aperture-shaped radiation beams onto said receiving medium said moving mirror means mounted for substantially traversing the length of said receiving medium.

15. A device as recited in claim 5 wherein said second projecting means comprises:

a. a fixed reflecting surface and b. a first moving reflecting surface movably mounted for substantially traversing the length of the receiving medium, and wherein said first projecting means comprises, c. said fixed reflecting surface, and d. a second moving reflective surface movably mounted for substantially traversing the length of said displaying means.

16. A device as recited in claim 13 further including single driving means for moving said first and second moving reflecting surfaces.

17. A device as recited in claim 16 wherein said first and second moving reflecting surfaces comprises mirror means and wherein said first mirror means is mounted in a first position to block said aperture-shaped radiation beam from said second mirror means for projecting said beam onto said receiving medium and a second position for exposing said second mirror means to said beam for displaying said beam.

18. A device as recited in claim 17 wherein said first and second mirror means are mounted in a common movable supporting element.

19. A device as recited in claim 15 wherein said viewing means is disabled and said device further comprises:

a. a shift register for storing some of said electrical signals from said memory storage means and outputting said electrical signals in the order of storage for printing in one direction and, b. first-in/last-out register means for storing others of said electrical signals from said memory storage means and outputting said other electrical signals in the reverse order of storage for printing in another, opposite direction.

20. A device as recited in claim 19 wherein said first reflecting surface moves in a first direction while said comparing means compares stored output signals of said shift register with said detection signals, and said first reflecting surface moves in a second and opposite direction while said comparing means compares stored output electrical signals of said first-in/last-out register means with said detection signals.

21. A device as recited in claim 5 where said radiant energy source is a laser source.

22. A device as recited in claim 5 wherein said mask is in the form of a ring having apertures therethrough and wherein said means for sensing detection the position of said mask comprises magnetic code means associated with each of said groups of apertures forming a desired shape, said code means positioned on said mask.

23. The device as recited in claim 22 wherein said aperture shapes are alphanumeric for printing characters on said receiving medium.

24. A device as recited in claim 22 wherein said aperture shapes are a plurality of circles of varying diameter for producing greyscale pictorial representations on said receiving medium.

25. Apparatus as recited in claim 5 wherein said radiant energy beam is a laser beam and wherein said receiving medium is untreated paper.

26. Apparatus as recited in claim 5 wherein said memory storage means comprises a removable memory.

27. Apparatus as recited in claim 26 further comprising computing means for accumulating spacial data corresponding to the displayed apertureshaped beam, said computing means controlling the movement of said projecting means during projection onto said receiving medium to provide margin justification.

28. Apparatus as recited in claim 27 further comprising means for regulation the intensity of said first and second aperture-shaped beams.

* * * * *